(12) United States Patent
Sarchi et al.

(10) Patent No.: US 8,322,164 B2
(45) Date of Patent: Dec. 4, 2012

(54) PROCESS FOR PRODUCING A LOW POLARIZATION MODE DISPERSION OPTICAL FIBER

(75) Inventors: Davide Sarchi, Milan (IT); Sabrina Fogliani, Milan (IT); Roberto Pata, Milan (IT)

(73) Assignee: Prysmian Cavi E Sistemi Energia S.R.L., Milan (IT)

( * ) Notice: Subject to any disclaimer, the term of this patent is extended or adjusted under 35 U.S.C. 154(b) by 1063 days.

(21) Appl. No.: 10/568,686

(22) PCT Filed: Aug. 29, 2003

(86) PCT No.: PCT/EP03/09732
§ 371 (c)(1),
(2), (4) Date: Oct. 5, 2007

(87) PCT Pub. No.: WO2005/021453
PCT Pub. Date: Mar. 10, 2005

(65) Prior Publication Data
US 2008/0022725 A1    Jan. 31, 2008

(51) Int. Cl.
*C03B 37/025* (2006.01)
(52) U.S. Cl. ............................................. 65/435; 65/402
(58) Field of Classification Search .................. 65/435, 65/402
See application file for complete search history.

(56) References Cited

U.S. PATENT DOCUMENTS

| | | | |
|---|---|---|---|
| 4,969,941 A | 11/1990 | Kyoto et al. | |
| 5,114,338 A | 5/1992 | Tsuchiya et al. | |
| 5,298,047 A | 3/1994 | Hart, Jr. et al. | |
| 5,316,562 A | 5/1994 | Smithgall et al. | |
| 5,418,881 A | 5/1995 | Hart, Jr. et al. | |
| 6,148,131 A | 11/2000 | Geertman | |
| 6,240,748 B1 | 6/2001 | Henderson et al. | |
| 6,876,804 B2 * | 4/2005 | Chen et al. | 385/123 |
| 6,920,270 B2 * | 7/2005 | Galtarossa et al. | 385/123 |
| 2003/0010066 A1 * | 1/2003 | Sasaoka et al. | 65/402 |
| 2004/0184751 A1 | 9/2004 | Chen et al. | |

FOREIGN PATENT DOCUMENTS

| | | |
|---|---|---|
| CN | 1761896 A | 4/2006 |
| EP | 0 582 405 A1 | 2/1994 |
| EP | 1 174 396 A1 | 1/2002 |
| EP | 1 297 371 B1 | 4/2003 |
| WO | WO-97/26221 | 7/1997 |

(Continued)

OTHER PUBLICATIONS

Barlow et al.; "Anisotropy in Spun Single-Mode Fibres", Electronics Letters, vol. 18, No. 5, pp. 200-203, (1982).

(Continued)

*Primary Examiner* — Queenie Dehghan
(74) *Attorney, Agent, or Firm* — Finnegan, Henderson, Farabow, Garrett & Dunner, L.L.P.

(57) ABSTRACT

In a process for producing a low polarization mode dispersion optical fiber, which comprises the steps of drawing a glass preform into an optical fiber and of spinning, during drawing, the optical fiber about an optical fiber axis, the spinning is imparted according to a bidirectional and substantially trapezoidal spin function, which includes zones (P) of substantially constant amplitude (plateau) and zones of transition (T) where inversion of the spin direction takes place, wherein the extension (p) of the zones of substantially constant amplitude is greater than the extension (t) of the zones of transition, and the number of inversions of the direction of spin in a length of fiber of 20 m is at most two.

7 Claims, 6 Drawing Sheets

FOREIGN PATENT DOCUMENTS

WO        WO-02/03115        1/2002
WO        WO 2004/095097 A1        11/2004

OTHER PUBLICATIONS

Pizzinat et al., "Influence of the Model of Random Birefringence on the PMD of Periodically Spun Fibers", WJI, Proceedings of Conference OFC03, vol. 1, pp. 366-367, (2003).

Corsi et al.; "Analytical Treatment of Polarization-mode Dispersion in Single-mode Fibers by means of, the Backscattered Signal", J. Opt. Soc. Am. A, vol. 16, No. 3, pp. 574-583, (1999).

Wai et al.; "Polarization Mode Dispersion, Decorrelation, and Diffusion in Optical Fibers with Randomly Varying Birefringence", IEEE Journal of Lightwave Technology, vol. 14, No. 2, pp. 148-157, (1996).

\* cited by examiner

PROCESS FOR PRODUCING A LOW POLARIZATION MODE DISPERSION OPTICAL FIBER

CROSS REFERENCE TO RELATED APPLICATION

This application is a national phase application based on PCT/EP2003/009732, filed Aug. 29, 2003, the content of which is incorporated herein by reference.

BACKGROUND OF THE INVENTION

1. Field of the Invention

The present invention relates to a process for producing a low polarization mode dispersion (PMD) optical fiber.

2. Description of the Related Art

Optical signals transmitted through single-mode optical fibers comprise two orthogonal polarization modes (typically denoted TE and TM) that, in case of a fiber with a perfectly cylindrical core of uniform diameter, propagate independently of one another at a common velocity. Real optical fibers have considerable variations in the shape of the core along their length. They may also undergo non-uniform stresses such that their cylindrical symmetry is disrupted. Because of these factors, a phase difference can accumulate between the two modes, and the fiber is said to show "birefringence".

An important parameter in the study of the birefringence of an optical fiber is what is known as the beat length, which, as described in U.S. Pat. No. 5,418,881 in the name of AT&T Corp., corresponds to the length of fiber required for a given state of polarization to be repeated. In other words, the beat length corresponds to the length of fiber required for the two components of the fundamental mode, initially in phase with each other, come to be in phase again, on the assumption that the fiber maintains a constant birefringence over this length.

When pulsed signals are transmitted in an optical fiber, the birefringence is a potential cause of the spreading of the pulses. This is because, if an input pulse excites both of the polarization components, it becomes wider at the output of the fiber, since the two components are dispersed along the fiber owing to their different group velocities. This phenomenon, known as polarization mode dispersion (PMD), has been widely studied in recent years because of its importance in periodically amplified light guide systems.

Typically, the phenomenon of PMD leads to a limitation of the width of the signal transmission band and, consequently, a degradation of the performance of the optical fibers along which the aforesaid signals are transmitted. This phenomenon is therefore undesirable in systems of signal transmission along optical fibers, especially in those operating over long distances, in which it is necessary to minimize any form of attenuation or dispersion of the signals to guarantee high performance in transmission and reception.

The process of drawing an optical fiber is typically carried out by means of suitable equipment known as "drawing tower", starting from a glass preform. The structural and geometrical irregularities of the optical fiber that give rise to birefringence mainly originate during the process of manufacturing of the glass preform. In the drawing process, after the preform has been placed in a vertical position and heated to a temperature above the softening point, the molten material is drawn downwards at a controlled velocity in such a way as to produce a threadlike element that forms the optical fiber itself.

A possible solution to the problem of PMD is to spin the fiber about its axis during drawing, so as to rotate its polarization axes. As a result, the optical pulse propagates alternately on the slow and on the fast axis, thus compensating the relative delay and reducing the pulse spreading. This is equivalent to have a local effective refractive index for the pulse equal to the mean refractive index on the two axes, the average being taken over the pulse length along the fiber. With "spin profile" or "spin function" it is intended the function correlating the number of turns per meter imparted to the fiber with the position along the fiber.

The effect of spin on PMD is also equivalent to a reduction of the effective fiber birefringence. The higher the rate of axes rotation (twist/m), the lower the local effective birefringence. So a practical parameter that allows evaluating the PMD reduction of a generic spin profile is the average of spin rate modulus. The highest is the natural birefringence of the fiber, the highest this parameter should be in order to guarantee a low PMD.

The study of the different possible spin functions has led to disregard unidirectional spin profiles, because of the difficulty in removing the elastic torsion transmitted along the fiber downstream the spin application point, which torsion is therefore collected in the fiber wound on the bobbin.

Bidirectional spin, by alternating the spin direction, can prevent accumulation of residual elastic twist in the fiber.

Several different bidirectional spin profiles have been proposed in the past.

U.S. Pat. No. 6,148,131 relates to a method of making a twisted optical fiber with low polarization mode dispersion method wherein the fiber is bidirectionally spun with a uniformly periodic function of longitudinal position.

International patent application WO 97/26221 illustrates different alternate spin profiles, such as sinusoidal, square and triangular, and suggests the use of a spin function that is not substantially sinusoidal and has a sufficient variability to provide a reduction in the PMD for a plurality of beat lengths, for example a frequency-modulated sinusoidal function or an amplitude-modulated sinusoidal function.

U.S. Pat. No. 5,298,047 teaches imparting to the fiber an alternate spin not having a constant spatial frequency, so that the resulting fiber has a variable spatial spin pitch.

SUMMARY OF THE INVENTION

The Applicant has noticed that the known bidirectional spin profiles are affected by several problems, both optical and mechanical.

As concern the optical aspects, the Applicant has found that spin inversions (i.e. variations of the direction of spinning) have a deleterious effect on PMD. This is because, in the zones of spin inversions, where the spin rate is low, the birefringence modulus is not sufficiently averaged to prevent spreading of the pulses. Therefore, spin inversions cause a local increase of PMD. The more extended are the zones of low spin rate, the higher is the PMD. A deeper explanation of the causes of PMD increase due to spin inversions will be presented in the following. The Applicant has verified that the typical bi-directional spin profiles (the more common being the sinusoidal spin profile) are designed irrespective of said phenomenon, in particular the zones of inversions are too high in number and have a too high extension, and the increase of PMD so generated is therefore relatively high.

The mechanical aspects concern possible damages and wearing of the spinning device. To guarantee a sufficiently high average spin rate, high peak profile amplitude is typically needed to compensate those positions of the profile where the rotation slows down to change direction. However, the higher is the amplitude peak, the higher is the acceleration experienced by the spinning device. Likewise, the higher is the number of inversions per unit length, the higher is the number of times the device undergo acceleration. Such acceleration is detrimental for the device since it reduces the mechanical efficiency thereof.

The Applicant has tackled the problem of providing a bi-directional spin function that allows to at least reduce the above-mentioned problems and to obtain a low PMD in the fiber. For the purposes of the present invention, with "low PMD" it is intended a PMD lower than about $0.2 \text{ ps}/(\text{km})^{1/2}$.

The Applicant has found that by imparting to the fiber a bi-directional spin wherein the number of inversions of the direction of spin in each portion of fiber of 20 m length is lower or equal than two, the above-mentioned optical and mechanical problems are at least reduced and a fiber with low PMD can be obtained.

In Applicant has in fact found that a reduction of the number of spin inversions (per unit length) reduces both the number of times the device is subject to acceleration and the number of fiber portions per unit length giving rise to a high PMD. Therefore, the device is less subject to wearing and damages and the fiber has a lower PMD.

Advantageously, the bi-directional spin function is a substantially trapezoidal spin function, i.e. a bi-directional function including zones of substantially constant amplitude (plateau) and zones of transition where the inversion of the spin direction takes place, and the extension of the zones of substantially constant amplitude is greater than the extension of the zones of transition. For the purposes of the present invention, with "zone with substantially constant amplitude" it is intended a zone of the spin function wherein the maximum variation of the amplitude is 0.5 turns/m.

The extension of the constant amplitude zones (plateau) is preferably much greater than the extension of the inversion zones, so that the average spin rate corresponds substantially to the absolute value of the spin rate in the zones of constant amplitude and the reduction of the spin rate at the inversion points does not significantly influence that average value. In other words, this spin profile does not require a high amplitude peak to compensate the low spin rate at inversion as in other types of bi-directional spin functions.

The bidirectional spin function herein proposed is preferably non-periodic, so as to prevent wearing of specific zones of the contact surface of the spinning device. In fact, the Applicant has observed that, if the spinning is imparted by rolling the fiber on a contact surface of the device, and if the bidirectional spin function is periodic, inversions (and then high accelerations) take place always in the same positions of the device surface, which can quickly swear.

A periodic spin profile would also tend to cause resonance effects on the fiber moving along the drawing line. The consequent oscillation can for example be detrimental for those systems that measure fiber tension through measurement of fiber oscillation. The resonance phenomenon can affect the coating concentricity as well.

In a first aspect, the present invention thus relates to a process for producing a low polarization mode dispersion optical fiber, comprising the steps of drawing a glass preform into an optical fiber; and spinning, during drawing, the optical fiber about an optical fiber axis; wherein spinning the optical fiber comprises imparting to the fiber a spin according to a bidirectional spin function, wherein the number of inversions of the spin direction in a length of fiber of 20 m is at most two. In other words, during drawing the fiber is spun with inversions of the spin direction, wherein the number of inversions in a length of fiber of 20 m is at most two. Preferably, the bi-directional function is non-periodic.

Advantageously, the bidirectional spin function includes zones of substantially constant amplitude and zones of transition where inversion of the spin direction takes place, wherein the extension of the zones of substantially constant amplitude is greater than the extension of the zones of transition.

The extension of each of the transition zones is preferably lower than 20%, more preferably lower than 10%, of the extension of the zone of substantially constant amplitude preceding it.

The number of inversions of the direction of spin in a length of fiber of 25 m is preferably at most two.

The bi-directional spin function has a peak amplitude (i.e. a maximum spin rate) that is preferably comprised between 2 turns/m and 10 turns/m, more preferably comprised between 2 turns/m and 5 turns/m.

The distance between two consecutive inversions is preferably lower than 15 m.

Preferably, the bi-directional function is trapezoidal.

BRIEF DESCRIPTION OF THE DRAWINGS

The invention is described in detail below with reference to the attached figures, in which a non-restrictive example of application is shown. In particular.

DETAILED DESCRIPTION OF THE INVENTION

Figure 1:
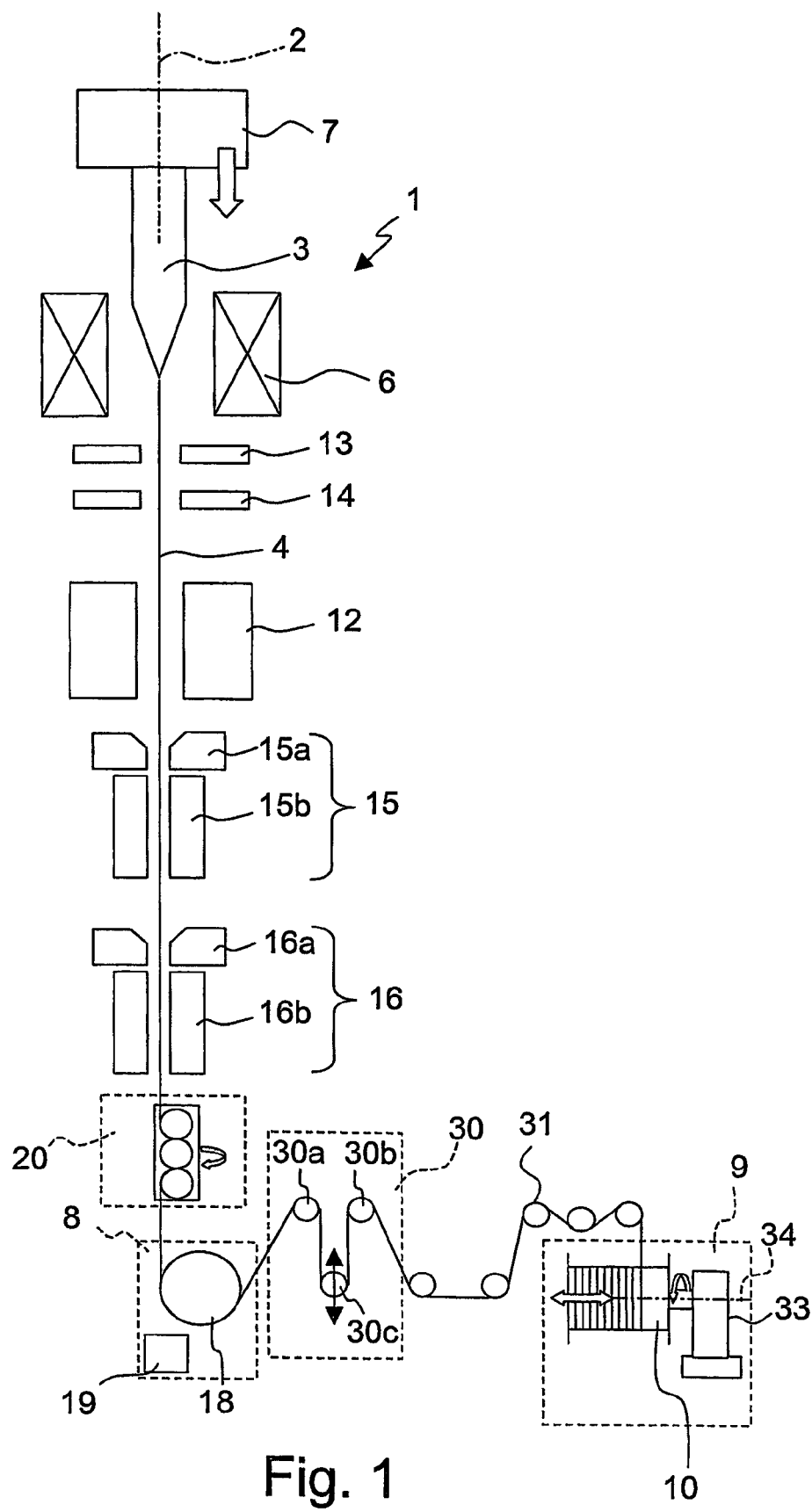
FIG. 1 shows a drawing tower for drawing and spinning an optical fiber according to the method of the present invention.

FIG. 1 illustrates a drawing tower 1 for drawing an optical fiber 4 from a glass preform 3 along a vertical axis 2.

Tower 1 comprises a furnace 6 for performing a controlled melting of a lower portion of the glass preform 3 (also known as preform "neckdown"), a feeding device 7 for supporting the preform 3 and feeding it into the furnace 6 from the above, a traction device 8 (at a lower end of the tower) for pulling down the optical fiber 4 and a winding device 9 for storing the fiber 4 onto a reel 10.

The furnace 6 may be of any type designed to produce a controlled melting of a preform. Examples of furnaces that can be used in the tower 1 are described in U.S. Pat. No. 4,969,941 and U.S. Pat. No. 5,114,338.

Preferably, a cooling device 12, for example of a type having a cooling cavity designed to be passed through by a flow of cooling gas, is situated coaxial to axis 2 underneath the furnace 6 for cooling the fiber 4 leaving it.

Tower 1 may also be provided with a tension-monitoring device 13 (for example of the type described in U.S. Pat. No. 5,316,562) and a diameter sensor 14 of a known type, preferably positioned between the furnace 6 and the cooling device 12, for measuring the tension and the diameter of the fiber 4, respectively.

Tower 4 further comprises a first and a second coating device 15, 16 of a known type, positioned underneath the cooling device 12 in the vertical drawing direction and designed to deposit onto the fiber 4, as it passes through, a first protective coating and, respectively, a second protective coating. Each coating device 15, 16 comprises, in particular, a respective application unit 15a, 16a which is designed to apply onto fiber 4 a predefined quantity of resin, and a respective curing unit 15b, 16b, for example a UV-lamp oven, for curing the resin, thus providing a stable coating.

The traction device 8 may be of the single pulley or double pulley type. In the illustrated embodiment, the traction device 8 comprises a single motor-driven pulley (or "capstan") 18 that is designed to draw the fiber 4, already coated, in the vertical drawing direction. The traction device 8 may be provided with an angular velocity sensor 19 that is designed to generate a signal indicating the angular velocity of the pulley 18 during its operation. The speed of rotation of the pulley 18 and, therefore, the drawing speed of the fiber 4, may be varied during the process, for example as a response to a diameter variation detected by detector 14.

Tower 4 further comprises a spinning device 20, positioned between coating device 16 and traction device 8, for imparting a spin to the fiber 4 about its axis during drawing. For the purposes of the present invention, the term "spin" denotes the ratio (disregarding a constant multiplication factor) between the angular velocity of rotation $d\theta/dt$ of the fiber (where $\theta$ is the angle of rotation of the fiber measured with respect to a fixed reference point) and the velocity of drawing. The spin defined in this way is typically measured in turns/m.

Figure 2:
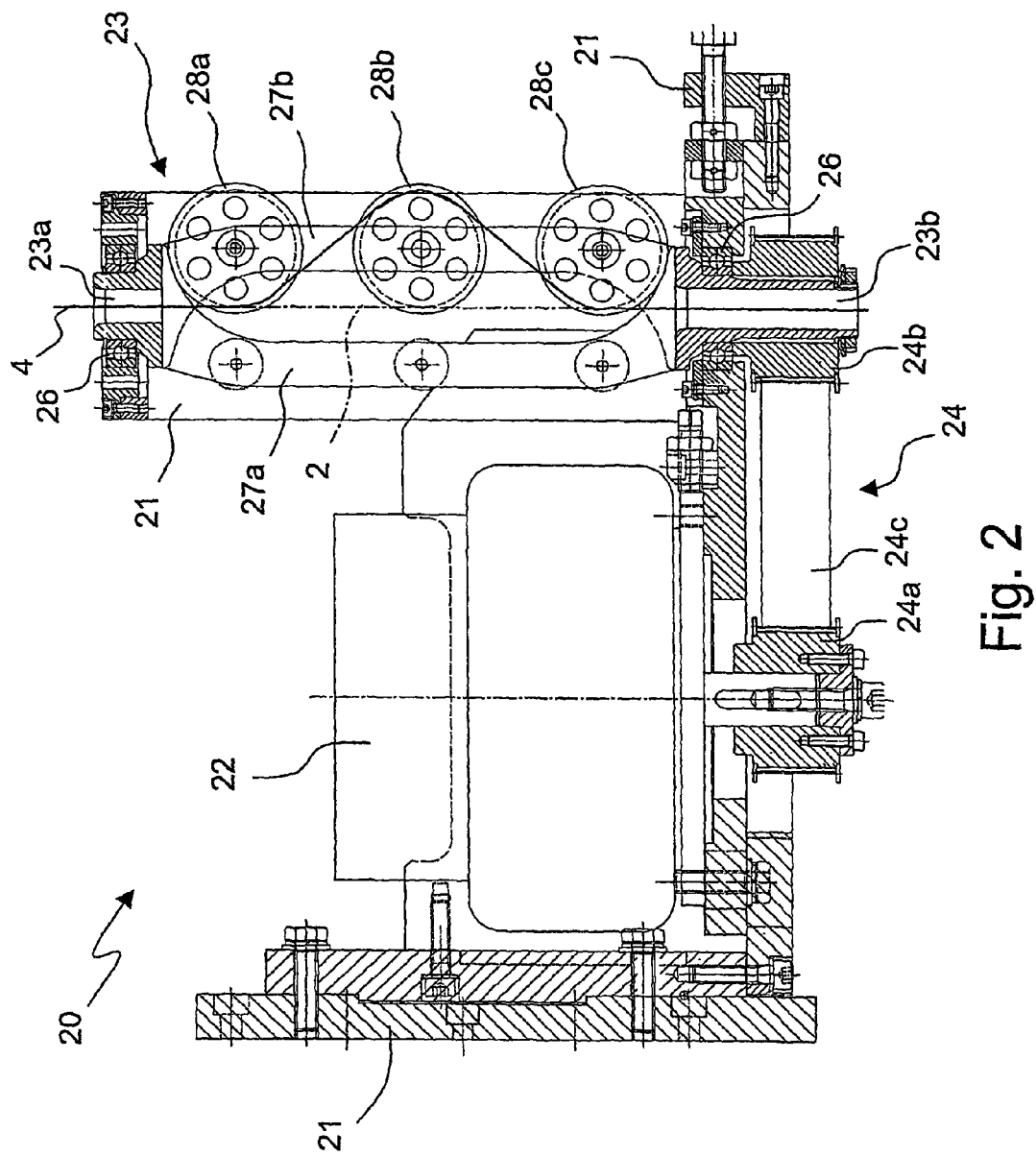
FIG. 2 represents a device for spinning the fiber.

FIG. 2 shows a possible embodiment of the spinning device 20. Spinning device 20 comprises a fixed support frame 21, a DC motor 22 held by the frame 21 and a rotating member 23 held by the frame 21 and coupled to the motor 22 through a belt transmission 24. The belt transmission 24 comprises a first driving pulley 24a rigidly coupled to motor 22, a second driving pulley 24b rigidly coupled to the rotating member 23 and a belt 24c connecting the first driving pulley 24a to the second driving pulley 24b.

The rotating member 23 has a rotation axis corresponding to axis 2, i.e. to the axis of drawing of the fiber 4. The rotating member 23 comprises a first and a second sleeve-like end portion 23a, 23b (respectively upper and lower), which are rotatably coupled to the support frame 21 by means of respective bearings 26 and which allows passage of the fiber 4 there through. The second end portion 23b is coupled with the second driving pulley 24b.

The rotating member 23 comprises two arms 27a, 27b, extending from the first end portion 23a to the second end portion 23b. Arms 27a, 27b are substantially C-shaped with a main straight central region parallel to axis 2, and are arranged symmetrically to each other with respect to axis 2. One of the two arms (the one indicated with 27b in the drawing) carries a first, a second, and a third idle-mounted rotating pulley 28a, 28b, 28c (from up to down in the drawing), substantially aligned in a direction parallel to axis 2. The three pulleys 28a, 28b, 28c have the corresponding axes perpendicular to axis 2 and are dimensioned so that the respective guiding grooves are substantially tangent to axis 2.

With reference again to FIG. 1, tower 4 may also comprise a tension-control device 30, commonly known as "dancer", for adjusting the tension of the fiber 4 downstream the traction device 8. Tension-control device 30 is designed to counterbalance any variations in tension of the fiber 4 between pulley 18 and winding device 9.

Tension-control device 30 may comprise, for example, a first and a second pulley 30a, 30b that are mounted idle and in a fixed position, and a third pulley 30c which is free to move vertically, under the action of its own weight and the tension of the fiber 4. In practice, pulley 30c is raised if there is an undesirable increase in the tension of the fiber 4 and is lowered if there is an undesirable decrease in the tension of the fiber 4, so as to keep the said tension substantially constant. The pulley 30c may be provided with a vertical position sensor (not shown) that is designed to generate a signal indicating the vertical position of the pulley 30c and therefore indicating the tension of the fiber 4.

A plurality of pulleys 31 (or guiding members of other types) are advantageously provided for guided the fiber 4 from the tension-control device 30 to the winding device 9.

Winding device 9 comprises a motorized device 33 to set the reel 10 into rotation about its axis, indicated with 34, and to reciprocate the reel 10 along axis 34, so as to allow helix winding of the fiber 4 thereon during drawing.

The drawing tower 1 operates as follows.

The supporting device 7 feeds the preform 3 along axis 2 to the furnace 6, where a lower portion thereof (the neckdown) is melted. The fiber 4 drawn from the neckdown is pulled down from the traction device 8 and wound onto the reel 10 by the winding device 9. Between capstan 18 and reel 10, the tension-control device 30 regulates the tension of fiber 4.

As the fiber 4 is drawn, sensors 13 and 14 monitor its tension and diameter. Such monitoring can be used to control the drawing process, for example by operating on the traction speed. When exiting the furnace 6, the fiber 4 is cooled by the cooling device 12 and is coated with two protective layers by coating devices 15, 16.

The coated fiber 4 is then subjected to a bi-directional spin with a spin function according to the present invention. This is obtained by setting into alternate rotation the rotating member 23 about axis 2. When spun, the fiber 4 transmits a corresponding torque upstream to the preform neckdown, where the plastic deformation of the melted glass "absorbs" the torque and "transforms" it into an intrinsic orientation of the birefringence axes of the fiber 4. This intrinsic torsion is "frozen" into the fiber 4 as the fiber cools.

The fiber 4 is then guided by pulleys 31 in a direction substantially perpendicular to axis 34. While being rotated about axis 34, reel 10 is also alternately translated along axis 34 to allow helical winding of the fiber 4.

Figure 3A:
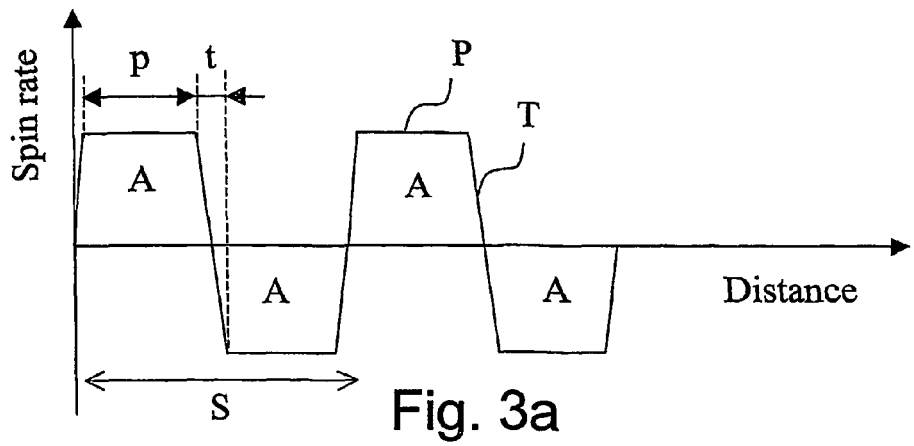
FIGS. 3-6 are diagrams relating to simulations and experiments.
Figure 3B:
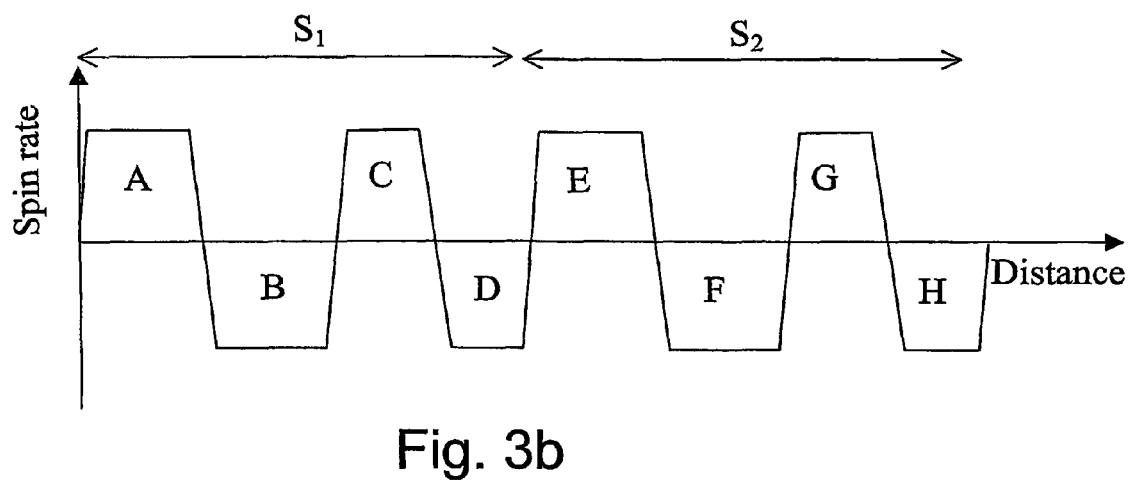
Figure 3C:
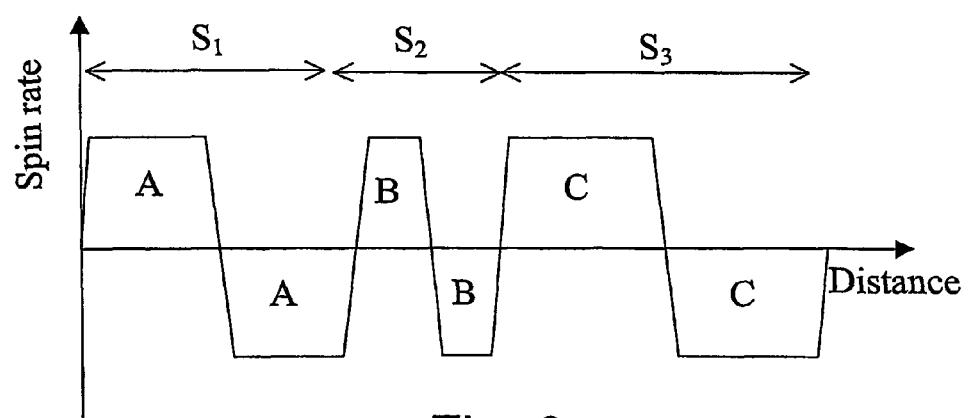

FIGS. 3a, 3b and 3c show three possible spin functions according to the present invention.

The different spin functions are bi-directional and advantageously include zones P of substantially constant amplitude ("plateau") and zones T of transition where inversion of the spin direction takes place. The spin function is therefore substantially a trapezoidal function. The peak amplitude of the different "plateau" zones is substantially the same along the fiber.

The peak amplitude of the spin function, i.e. the maximum spin rate, should be preferably selected in accordance to the beat length of the fiber. The Applicant has verified that a maximum spin rate applied to the spinning device (i.e. a peak amplitude of the spin function) comprised between 2 turns/m and 10 turns/m allows a sensible reduction of the PMD but, when the fiber beat length is higher than 5 m, a maximum spin rate between 2 and 5 turns/m can be enough to reduce the. PMD. Moreover, for a given extension of the transition zone, the lower the spin rate the lower are the accelerations of the spinning device. In other words, because of the low spin rate, the inversion of spin direction is less critical for the device and can be tolerable for the process.

The Applicant has moreover found that the inversion sites are sources of PMD increase (for the reasons explained below) and of swearing of the spinning device (because of the accelerations thereof), so the number of inversions of the spin direction shall be particularly low. In practice, the spin function is designed so that the number of inversions in a length of 20 m is at most two. More preferably, the number of inversion in a length of 25 m is at most two.

Moreover, it has been verified that, for the same reasons, the extension p of the "plateau" zones shall be greater than the extension t of the transition zones. Therefore, the fiber is advantageously spun according to a bidirectional spin function including zones of substantially constant amplitude and zones of transition where inversion of the spin direction takes place, wherein the extension of the zones of substantially constant amplitude is greater than the extension of the zones of transition, and the number of inversions of the direction of spin in a length of fiber of 20 m is at most two, preferably at most 25 turns/m.

Preferably, the extension p of the "plateau" zones shall be much greater than the extension t of the transition zones. Quantitatively, the extension of the transition zone should be lower than 20% of the extension of the "plateau" preceding it (i.e. t/p<0.2). More preferably, the extension of the transition zone should be lower than 10% of the extension of the "plateau" preceding it. For the sake of simplicity in the design of the spin function, the different transition zones may have all the same extension.

The spin function according to the present invention is also designed to prevent accumulation of elastic twist in the fiber due to spinning. This is obtained by providing a sequence of regions (each represented by a trapeze) in which adjacent regions have opposite signs (i.e. opposite spin direction) and wherein the total area of the regions of positive sign is substantially the same of the total area of the regions of negative signs (i.e. in each sequence of regions, the total number of turns in one direction is substantially equal to the total number of turns in the opposite direction). The simplest example is a periodic function wherein a sequence is formed by two half cycles (two adjacent regions) of opposite signs and same area. Other choices of the sequences are however possible, as described in the following.

It has to be noticed that the above selection of the sequences could be insufficient to prevent accumulation of elastic twist, if the distance between the spinning device and the storing bobbin is insufficient to allow de-twisting of the fiber. EP 1174396A1 describes how to determine the length of a free zone (in the drawing tower) required to cancel out the elastic torsion stored in the optical fiber because of spinning. The distance between the spinning device and the storing bobbin should therefore be greater than a predetermined value, which can be determined according to the teaching of the above patent application. It has however also to be noticed that the elastic twist accumulated in the wound fiber can be at least partially removed when the fiber is unwound from the drawing bobbin to be rewinded on shipping bobbins and/or in further steps, such as in the coloring and cabling processes.

In FIGS. 3a, 3b and 3c, regions with same area (i.e. same extension) are indicated with a same letter.

FIG. 3a shows a periodic bidirectional function that, with an appropriate choice of the ratio t/p and of the period, is suitable for the purposes of the present invention. Being a periodic function, the above requirement on the number of inversions (at most two in a length of 20 m) corresponds to set a period higher than 20 m. The spin function of FIG. 3a is a "mirror-like" function, i.e. a function wherein each sequence is formed by two identical regions of opposite sign (A-A). Moreover, the sequences are identical to each other. Since the number of turns imparted when applying the spin in one direction is the same of that imparted immediately after, no residual twist is accumulated in the fiber.

In the spin function of FIG. 3b each sequence is formed by a number of regions greater than two, having different extension and a same constant peak amplitude. In the particular example illustrated, a first sequence $S_1$ is formed by regions A, B, C, D and a second sequence $S_2$ is formed by regions E, F, G, H. Again, the extension of such regions is chosen so that, in each sequence, the total number of turns of the fiber in one direction is substantially the same of that in the opposite direction. Therefore, the sum of the areas of regions A, B, C, D is substantially null, so as the sum of areas of regions E, F, G, H.

In practice, while the spin profile of FIG. 3a is more suitable to prevent accumulation of residual twist in the fiber due to the presence of mirror regions, the spin profile of FIG. 3b, lacking mirror symmetry, requires an appropriate choice of the regions' extension to remove the residual twist.

The spin function of FIG. 3b can be made periodic by repeating a same sequence (i.e. by choosing regions E, F, G, H identical to regions A, B, C, D, respectively).

Alternatively, the regions may be chosen in a random way, by an appropriate software. The extension of the N regions of the sequence may for example be selected according to the following method:

a software selects randomly N−1 different numbers $n_1$, $n_2$, ..., $n_{N-1}$ in the set of numbers comprises between a minimum value MIN and a maximum value MAX and separated by a predetermined step S (example: MIN=12.5, MAX=20.0, S=0.5, selection of three numbers $n_1$=14, $n_2$=15 and $n_3$=13);

in the series of N−1 numbers, opposite signs are assigned to adjacent numbers (example: +14, −15, +13);

the sum of the N−1 numbers is calculated and the sign of the sum changed, thus obtaining a $N^{th}$ number (example: −12);

it is checked if the $N^{th}$ number is comprised between MIN and MAX and if it is different from the first N−1 numbers (to avoid periodicity); if not, the $N^{th}$ number is modified with steps of S, until the above requirements are fulfilled (example: −12 modified into −12.5);

the N numbers so generated are provided to the spinning device, which associates them to extension of the regions of the spin profile.

FIG. 3c shows a non-periodic function including sequences different from each other. Each region is formed by two identical regions of opposite sign (a first sequence $S_1$ is formed by regions A, A, a second sequence $S_2$ is formed by regions B, B, a third sequence is formed by regions C, C). The absence of periodicity of the spin function prevents fiber resonant oscillations in the spinning device and allows distributing the high friction sites on the device surfaces when the fiber is rolled on a spinning surface.

In non-periodic spin functions, or in spin functions with relatively long periodicity (such as in the example of FIG. 3b when the sequences are identical) the distance between two consecutive inversions is preferably lower that 15 m.

The Applicant has performed some tests to evaluate the effect of the spin inversion on the fiber birefringence and has verified that, although the intrinsic birefringence of the fiber is substantially constant and independent from the presence of the spin (as shown by A. J. Barlow et al., "Anisotropy in spun single mode fibers", Electronics Letters, 1982, Vol. 18, No. 5.), a pulse experiences an effective birefringence that is related to the local spin rate. In the fiber sections where the spin rate is high, the effective birefringence is low because of the average effect provided by the rotation of the birefringence axes, while in the fiber sections where the spin is low (such as around the inversion sites) the effective birefringence is substantially equal to the intrinsic birefringence. It can therefore be argued that the inversion sites are responsible for an increase of the PMD.

The above phenomena can be explained also as follows.

EP 1297371 teaches how to optimize an alternate spin profile in order to reduce a fiber PMD. For an unperturbed optical fiber, whose beat length is known in advance, the spin profile can be tailored so that the delay between polarization modes or, equivalently, the differential group delay (DGD), is periodic over a spin period. The DGD is therefore limited and vanishes to zero with increasing length. However, in real fibers, the beat length is not known in advance with adequate resolution to define an optimized spin profile. Moreover, the environment perturbs the fiber and the birefringence becomes a stochastic variable having a limited correlation length (LF). As a result, the evolution of DGD cannot be kept periodic over a spin period and the PMD (defined as the mean value of DGD) increases as the square root of length. This effect is illustrated in A. Pizzinat et al., "Influence of the model of random birefringence on the PMD of periodically spun fibers", WJ1, Proceedings of conference OFC03.

The Applicant has found that the evolution of the mean DGD with length depends on the spin profile period. In particular, longer spin periods guarantee better PMD performance. Indeed, around the inversion of the spin direction the spin rate slows down, and locally the birefringence axes are not averaged with great efficiency; this causes a local increase of the DGD that is higher than the increase in the zones of constant spin rate (plateau).

The local increase of DGD has been studied via simulation. An optical fiber with a beat length $L_B$=5 m was considered. In unperturbed conditions the birefringence is constant and its correlation length is infinite. Seven trapezoidal spin profiles were optimized to make the DGD periodic over a spin period. Spin peak amplitude and period were kept fixed for every profile and the spin raise (i.e., the extension of the transition zones) was let free to vary for optimization purposes.

Table 1 defines the profiles so obtained.

TABLE 1

| Period (m) | Optimized Raise (m) | Amplitude (turns/m) |
|---|---|---|
| 5 | 1.05 | 3 |
| 8 | 1.0525 | 3 |
| 10 | 1.0542 | 3 |
| 15 | 1.0583 | 3 |
| 20 | 1.0621 | 3 |
| 25 | 1.0656 | 3 |
| 30 | 1.0687 | 3 |

Figure 4:
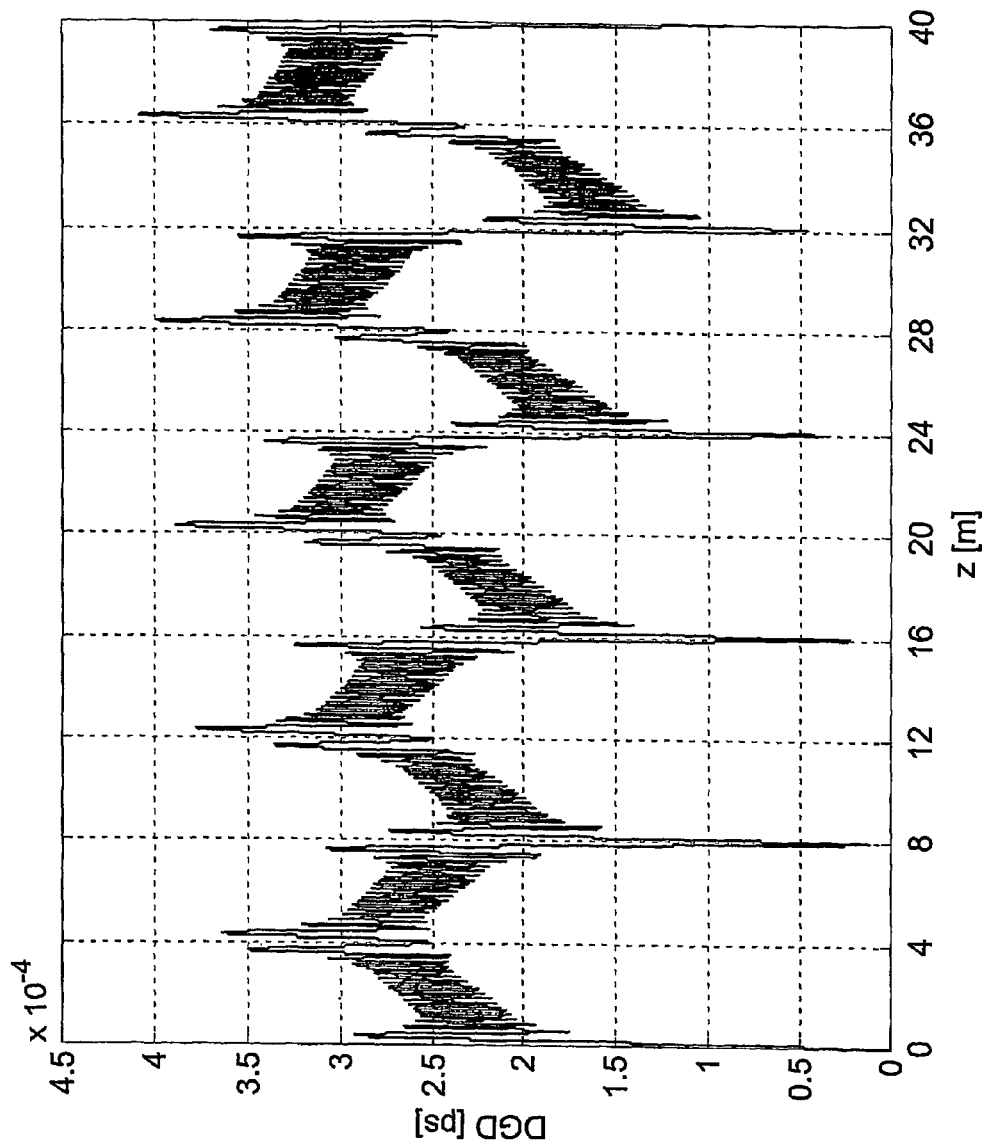

These profiles have been used to determine the DGD evolution under deterministic regime, still via simulation. In the simulation, the fiber was represented by a series of waveplates in cascade, according to a model known in the art as "waveplate model", which is described, for example in Corsi et al., "Analytical treatment of polarization dispersion in single-mode fibers by means of backscattering signal", J. Opt. Soc. Am. A, vol. 16, pp. 574-583, 1999. FIG. 4 shows the result of the simulation for the profile having period equal to 8 m. It can be observed that the DGD evolution is periodic over a period.

Figure 5:
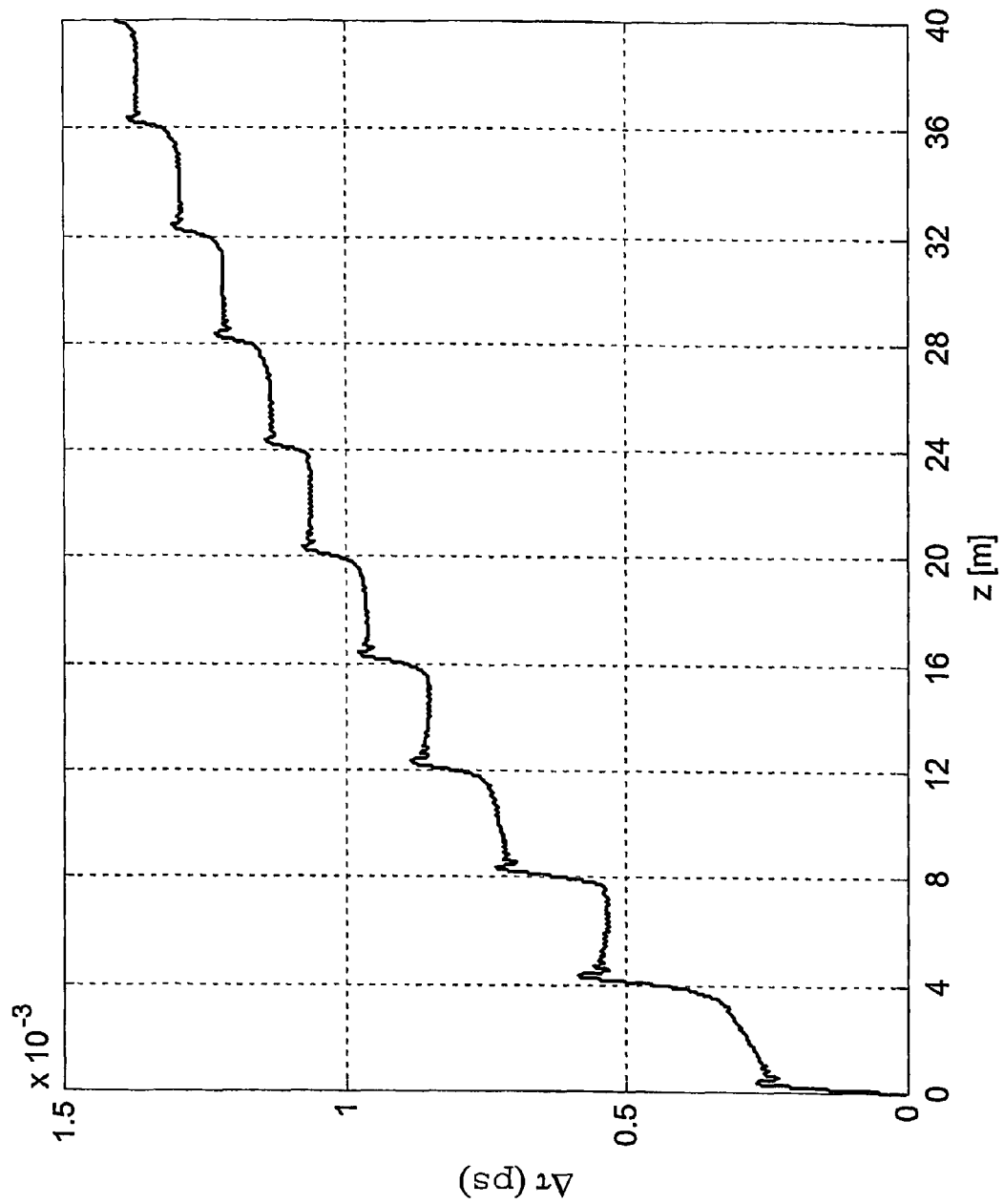

Real telecommunications fibers are, however, unavoidably affected by random coupling, due to random birefringence, which has to be taken into account. The effect of random coupling was studied by supposing the fiber to be affected by linear birefringence. See P. K. A. Way et al., "Polarization mode dispersion, decorrelation, and diffusion in optical fibers with randomly varying birefringence", IEEE J. Lightwave Tech., vol. 14, pp. 148-157, 1996; and A. Pizzinat et al., "Influence of the model of random birefringence on the PMD of periodically spun fibers", WJ1, Proceedings of conference OFC03. The non-perturbation condition has therefore been removed and simulation performed with a predetermined value of $L_F$. FIG. 5 shows the results for $L_F$=5 m. It can be observed that the mean DGD increases around the spin inversion sites.

It can be concluded that it is preferable to limit the number of inversion sites in a given length of fiber, i.e. to increase the spin period.

Figure 6:
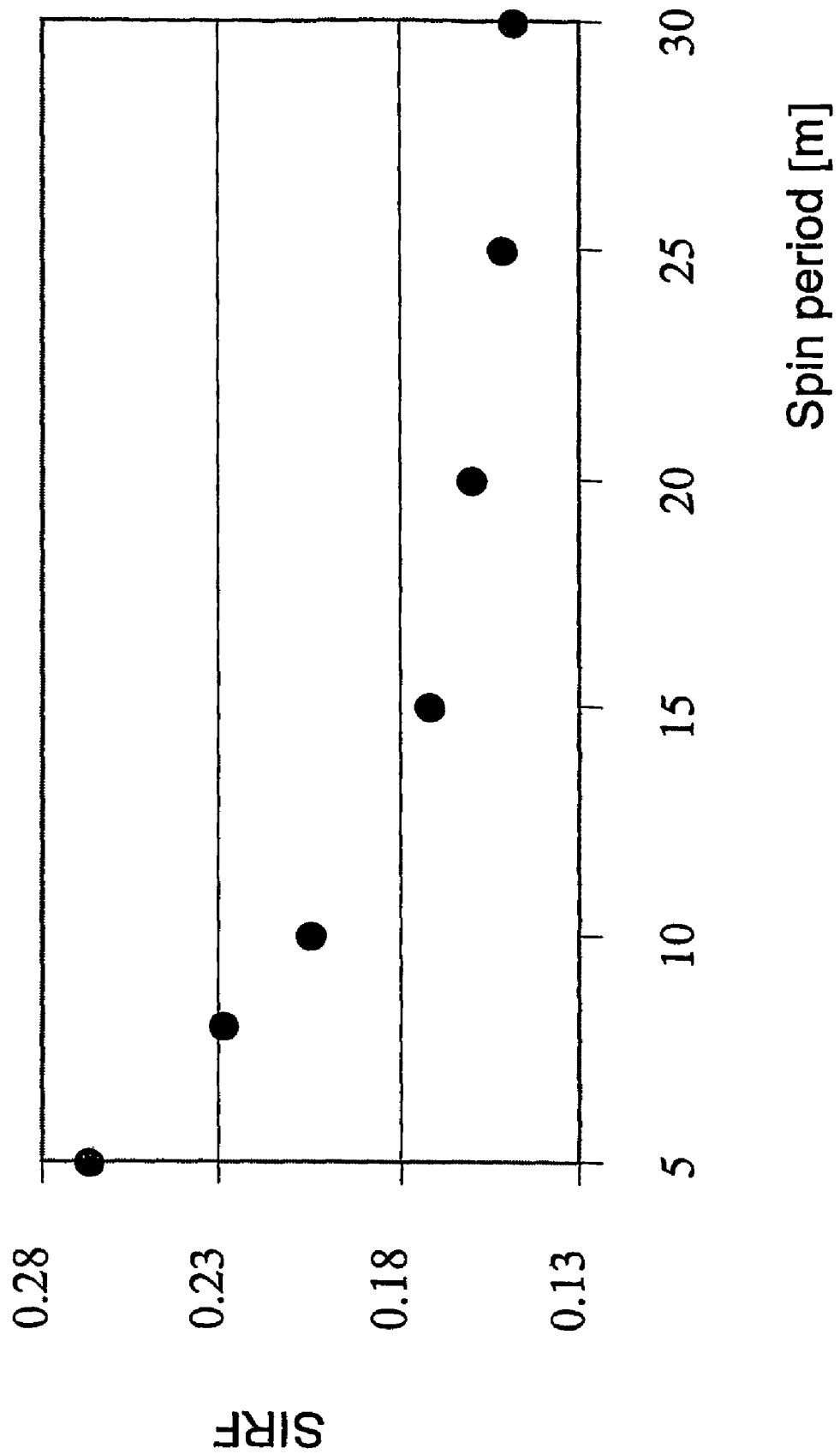

FIG. 6 shows the spin-induced reduction factor (SIRF) plotted versus the spin profile period. The SIRF is defined as the ratio between the mean DGD of the spun fiber and the mean DGD the same fiber would have if it were not spun. With reference to the profiles in the table, it can be appreciated that the mean DGD over 1 km decreases when the spin period increases.

The invention claimed is:

1. A process for producing a low polarization mode dispersion optical fiber, comprising
    drawing an optical fiber from a glass preform; and
    imparting to the optical fiber, during drawing, a spin about its axis with inversions of the spin direction, the number of the inversions in a length of fiber of 20 m being at most two, the spin being imparted according to a bidirectional spin function including zones of substantially constant amplitude followed by zones of transition where the inversions take place, a length of each transition zone being less than 20% of a length of the zone of substantially constant amplitude preceding it, and wherein the transition zone has a non-zero length,
    wherein the distance between two consecutive inversions is at most 15 m.

2. The process according to claim 1, wherein the spin is imparted according to a bi-directional and non-periodic spin function.

3. The process according to claim 1, wherein the length of each of the transition zones is less than 10% of the length of the zone of substantially constant amplitude preceding it.

4. The process according to claim 1, wherein the number of inversions of the direction of spin in a length of fiber of 25 m is at most two.

5. The process according to claim 1, wherein the peak amplitude of the bi-directional spin function is 2 turns/m to 10 turns/m.

6. The process according to claim 1, wherein the peak amplitude of the bi-directional spin function is between 2 turns/m to 5 turns/m.

7. The process according to claim 1, wherein the bi-directional spin function is trapezoidal.

* * * * *